US008985458B2

(12) United States Patent
Davis et al.

(10) Patent No.: US 8,985,458 B2
(45) Date of Patent: Mar. 24, 2015

(54) SYSTEM AND METHOD FOR CONVERSION OF FINGERPRINT CARDS INTO DIGITAL FORMAT USING MACHINE READABLE CODE

(71) Applicant: Cross Match Technologies, Inc., Palm Beach Gardens, FL (US)

(72) Inventors: Phillip Davis, Jupiter, FL (US); John Bagocius, Jupiter, FL (US); William Cavett, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 14/217,083

(22) Filed: Mar. 17, 2014

(65) Prior Publication Data

US 2014/0263654 A1 Sep. 18, 2014

Related U.S. Application Data

(60) Provisional application No. 61/799,575, filed on Mar. 15, 2013.

(51) Int. Cl.
*G06K 7/10* (2006.01)
*G06Q 50/18* (2012.01)
*G06K 17/00* (2006.01)

(52) U.S. Cl.
CPC ............ *G06Q 50/18* (2013.01); *G06K 17/0016* (2013.01)
USPC ..................... 235/462.01; 235/380

(58) Field of Classification Search
USPC ..................... 235/375, 462.01, 487
See application file for complete search history.

(56) References Cited

U.S. PATENT DOCUMENTS

| | | | |
|---|---|---|---|
| 6,292,092 B1 | 9/2001 | Chow et al. | |
| 7,382,911 B1 | 6/2008 | Meier et al. | |
| 2005/0020337 A1 | 1/2005 | Simmons | |
| 2007/0041622 A1 | 2/2007 | Calcagno | |
| 2007/0253605 A1* | 11/2007 | Maurer et al. | 382/124 |
| 2010/0280964 A1* | 11/2010 | Register et al. | 705/317 |
| 2011/0311111 A1* | 12/2011 | Allburn | 382/115 |
| 2013/0342862 A1* | 12/2013 | Fay et al. | 358/1.11 |

OTHER PUBLICATIONS

Electronic Biometric Transmission Specification (EBTS), V. 9.4, Dec. 14, 2012.
Fed Submit Fingerprint Solutions, Mentalix, Inc., 2010.
(Continued)

*Primary Examiner* — Christle I Marshall
(74) *Attorney, Agent, or Firm* — Kenneth J. Lukacher Law Group (57) ABSTRACT

A system and method for converting fingerprint cards into electronic files is provided having a computer system for inputting biographical information from each of the cards into memory of, or accessible by, the computer, and encoding the biographical information into a barcode which is printed by a printer on a label for affixing to the card. A scanner is operated for scanning each of the cards having the affixed label associated with the card. For each scanned image of a card, the computer system or another computer system decodes the biographical information from the barcode in the scanned image, segments fingerprint images of the fingerprints of different types of fingers at locations in the scanned image, and stores at least the decoded biographical information and the fingerprint images in an electronic fingerprint file for the card and/or a record in a database.

23 Claims, 8 Drawing Sheets

(56) References Cited

OTHER PUBLICATIONS

LSMS, Livescan Management Software, Innovative Technology for Fingerprint, Facial and Iris Capture, Cross Match Technologies, Inc., 2010.

MOBS, Mobile Operations Biometrics Software, Intelligent Biometric Data Capture with user-defined Auto Functionality, Cross Match Technologies, Inc., 2012.

WEBS Enrollment, Cross Match Technologies, Inc., 2012.

Forms Scanner, Aware, Inc., printout http://www.aware.com/biometrics/formscanner.html, Jul. 4, 2012.

* cited by examiner

SYSTEM AND METHOD FOR CONVERSION OF FINGERPRINT CARDS INTO DIGITAL FORMAT USING MACHINE READABLE CODE

This application claims the benefit of priority to U.S. Provisional Patent Application No. 61/799,575, filed Mar. 15, 2013, which is herein incorporated by reference.

FIELD OF THE INVENTION

This present invention provides a system and method (and software) for conversion of fingerprint cards into digital format using machine reading codes, such as barcodes. The invention is useful in that it easily associates fingerprint image data and biographic data from fingerprint cards and generates electronic fingerprint files that can then be used for fingerprint database searches or digital archive and storage of fingerprint records.

BACKGROUND OF THE INVENTION

Traditional scanning of fingerprint cards requires great amounts of time and labor. The typical fingerprint card will contain both fingerprint images and biographic data (name, date, place of birth . . . etc.). The biographic data located on the fingerprint card could be either typed or hand written and could also be written in multiple languages. An operator must visually read the biographic data from the fingerprint card biographic data locations and input the data into an electronic fingerprint file associated with the card. Next, the operator would scan the fingerprint card on a flatbed scanner generating an image of the fingerprint card. Finally the fingerprints on the fingerprint card image would be separated and the individual fingerprints written to the electronic fingerprint file thereby completing the process. Typically, an approved FBI scanner is used for scanning the cards, and the electronic fingerprint file format conforms to the Electronic Biometric Transmission Specification (EBTS). For the EBTS specification, see document IAFIS-DOC-01078-9.4, Federal Bureau of Investigation, Criminal Justice Information Services Division, 1000 Custer Hollow Road, Clarksburg, W. Va. 26306, U.S.A. Traditional biographical data entry and scanning must be done one card at a time, and each card takes around 10 to 15 minutes to process. It would thus be desirable to avoid the time consuming laborious tasks of biographical data entry and scanning so as to facilitate the creation of electronic searchable files.

SUMMARY OF THE INVENTION

Accordingly, it is a principal object of the present invention to provide a system and method for improving the conversion of information on fingerprint cards into a digital format for storage in electronic fingerprint files which is more efficient than traditional converting techniques.

Briefly described, the method embodying the present invention comprises the steps of collecting biographic data from a fingerprint record card having at least one fingerprint, generating a barcode (or other machine readable code) encoding the biographic data, and printing the barcode on a label, affixing the label to the fingerprint record card, scanning the card to read the barcode and obtain fingerprint images of each of the fingerprints recorded on the card, and storing in an electronic fingerprint file at least the fingerprint images and associated biographic data. The electronic fingerprint file can then be stored in a fingerprint database for fingerprint searches, or digital archive and storage of fingerprint records.

The encoding, printing, applying, scanning, and storing steps may be repeated for multiple fingerprint record cards. Such cards may be of different card types which differ from each other in locations of fingerprints of different finger types on the card. The scanning step for each of said card preferably parses the scanned card image to segment digital images of each of the fingerprints of different types on the card at locations in the image based upon the type of card. The scanning step preferably also identifies the type of fingerprint record card based on location of information on the card when presented to a scanner, or by the card type being obtained along with decoded biographical data when encoded in the barcode.

The present invention further embodies a system having a computer system operating in accordance with card conversion application software or program(s) to carry out the above described method. Such computer system has accessible local and/or remote memory, and is wired or wirelessly connected to input and output devices, such as a display, user interface, printer, and scanner for enabling the method described above. In the preferred embodiment, a system is provided for converting fingerprint cards into electronic files, in which each of the cards has at least biographical information and fingerprints of different types of fingers of a subject. The system has a computer system, memory of (or accessible by) the computer system, and a printer in communication with the computer system. The computer system operates in accordance with the software or program(s) for inputting the biographical information from each of the cards into the memory and encoding the biographical information into a barcode (or other machine readable code) which is printed by the printer on a label for affixing to the card. Further, a scanner is provided in communication with the computer system (or another computer system) which is operated for scanning each of the cards having the affixed label associated with the card to provide to such computer system (or another computer system) a scanned image of the card. The computer system (or another computer system) operates in accordance with the software for each of the cards scanned to decode the biographical information from the code from the scanned image of the card, segment a plurality of fingerprint images of the fingerprints of different types of fingers in the scanned image of the card, and store at least the decoded biographical information and the fingerprint images in an electronic file for the card and/or a record in a database in memory which is accessible to the computer system (or another computer system). In the case when another computer system is provided for scanning of cards and generating electronic fingerprint files representative of such cards and/or a record in a database, such another computer system can be at the same or different location (and have same or different accessible memory) from the computer system for inputting at least biographical information from cards and encoding such in barcode labels for affixing to cards.

The system of the present invention preferably operates in accordance with such software first to collect biographic data, generate barcode, print labels with barcode for affixing for different ones of multiple cards prior to performing the card scanning and storing of any electronic fingerprint files. The card scanning and storing of electronic fingerprint files are performed automatically utilizing a scanned image obtained from each of the multiple cards as each is fed automatically (e.g., bulk mode) into the scanner. Optionally, each card is singularly fed or positioned on the scanner.

The present invention replaces the current time and labor intensive, method with the ability to bulk scan the cards. The important factor in bulk or automated processing of finger print cards is to instill a process so that the machine readable data representing each card is presented during the actual card scanning to ensure the appropriate data are associated with the correct scanned image for the fingerprint card. For each card the operator reads and enters the biographic data from the card into the computer system operating in accordance with the card conversion software which creates a barcode label containing all of the associated biographic data. The operator then prints out the barcode label and affixes it to the front of the fingerprint card. Now the biographic data and fingerprints are physically collocated. The step of reading and entering biographic data associated with each card and permanently attaching the barcode label to the card is repeated for each individual card. The cards with the attached barcode labels are then set aside for future scanning operations. The cards with the barcode labels are now ready to be bulk processed via an approved bulk scanner and the card conversion software. One such list of approved scanners can be found on the FBI certified products list: https://www.fbibiospecs.org/IAFIS/Default.aspx.

As fingerprint cards are processed, the card conversion software determines the card type and the appropriate parsing template that will associate the scanned images to the data elements. The card type may be determined by the operator and entered into the card conversion software so that it could be encoded into the barcode label along with the biographic data. The card conversion software allows for the simultaneous processing of the fingerprint images and barcode images thru the scanning process. The appropriate fingerprint images are automatically separated and then added to the electronic fingerprint file. Also the biographic data contained in the barcode is decoded and also entered into the same electronic fingerprint file. All the biographic data and fingerprint images may also be added to an IAFIS (Integrated Automated Fingerprint Identification System), AFIS (Automated Fingerprint Identification System), ABIS (Automated Biometric Identification System) or any other database as individual entries (files or records) so that they can be searched against. This guarantees that the biographic and fingerprint data are correctly combined into the same electronic fingerprint file and/or database. The biographic data and fingerprint images thus may be written to either, or both, an electronic fingerprint file or database.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

Figure 1:
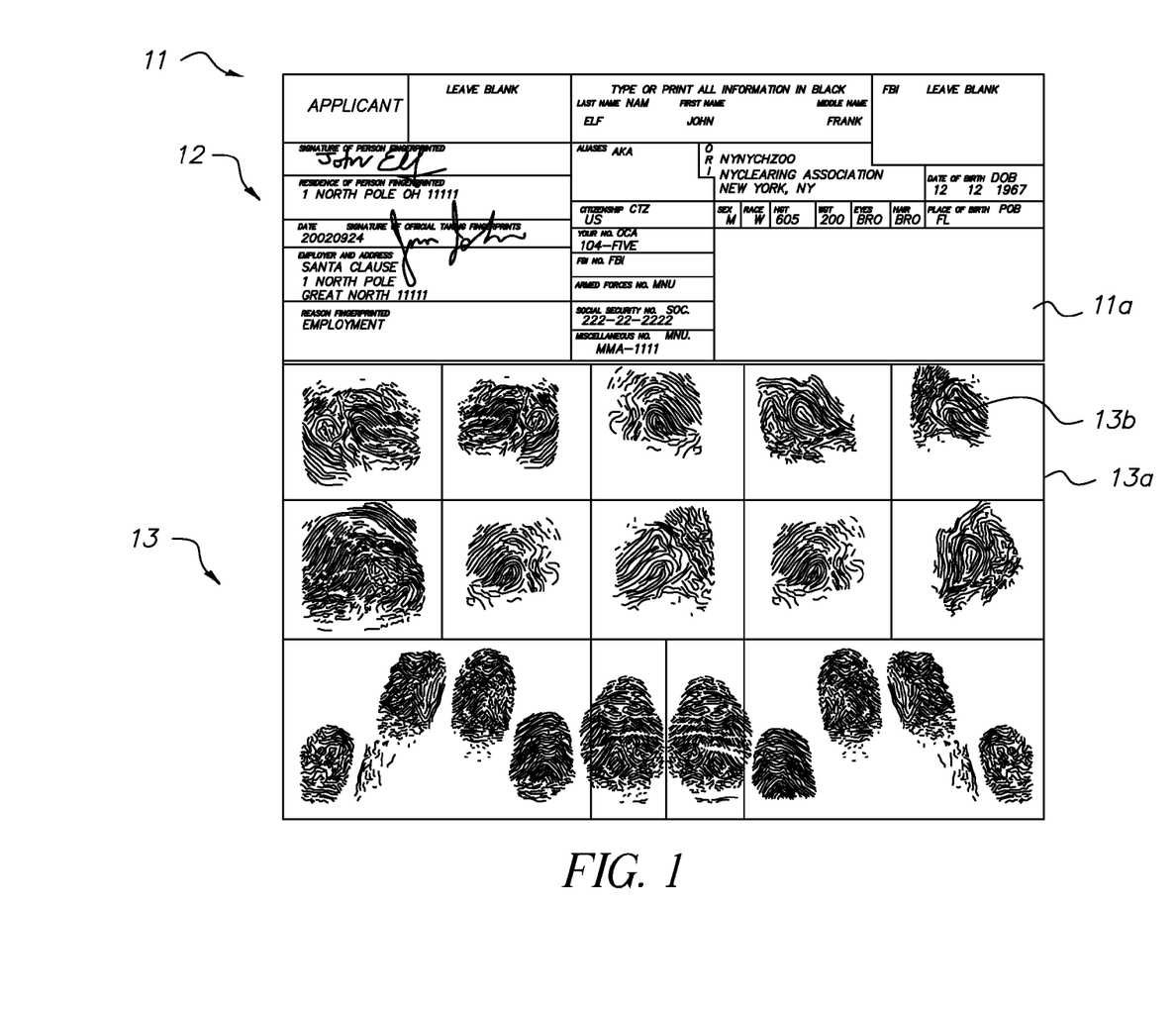
FIG. 1 is an example of a typical fingerprint record card file of the prior art.

A typical fingerprint record card 11 is shown in FIG. 1 which simultaneously contains both biographic data or information 12 and one or more fingerprints 13. The biographic data 12 may be printed, typed, or hand written and/or in English or foreign languages. For example, such cards may of paper media, such as typical card stock.

Figure 2:
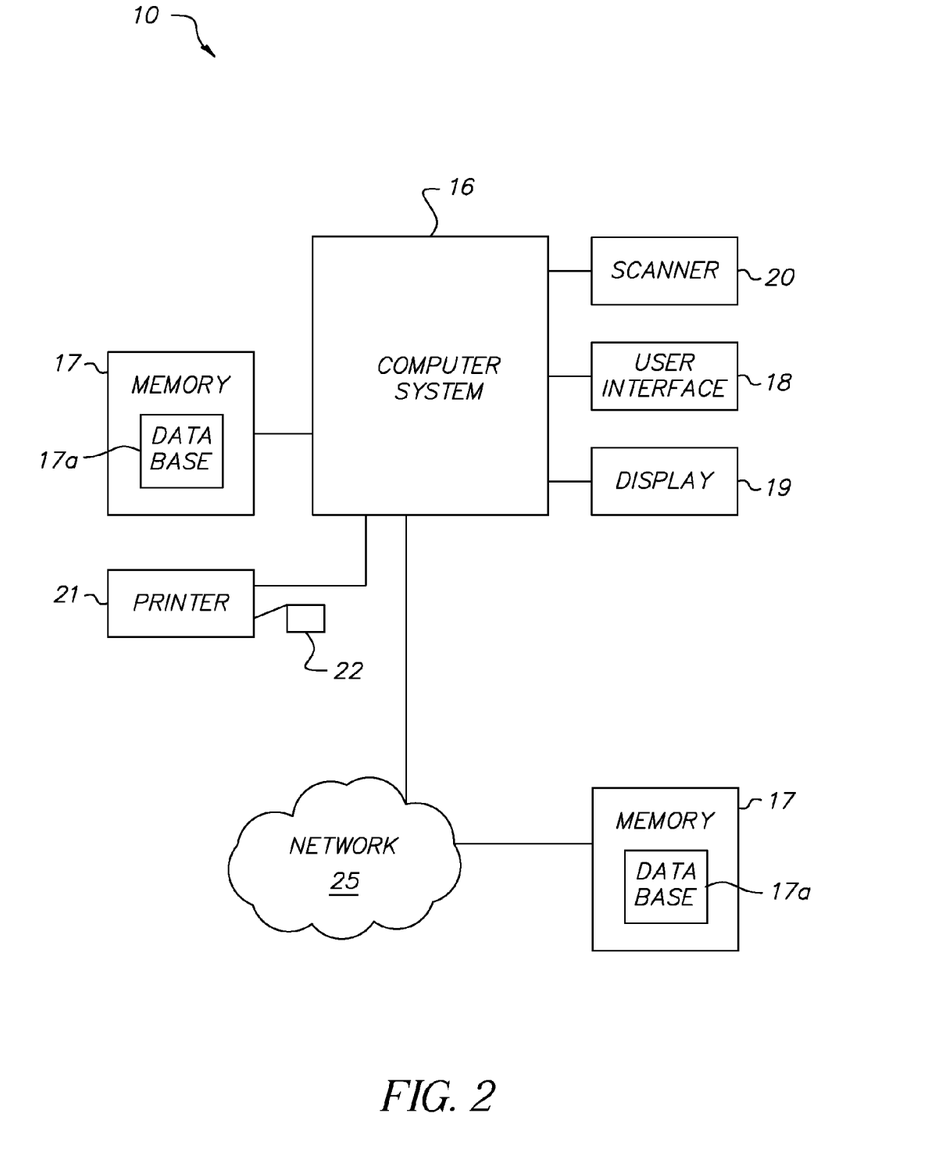
FIG. 2 is a block diagram of the system of the present invention.

Referring to FIG. 2, a system 10 of the present invention has a computer system 16, such as a personal computer system, workstation, lap-top, or other microprocessor based device which operates in accordance with programs or instructions stored in memory 17 (e.g., RAM and/or hard drive, or other computer-readable medium), which may be external and/or internal to computer system 16. Memory 17, or a part thereof, may also be accessible to computer system 16 via a network 25 (e.g., LAN, Internet, or WAN), via a wired or wireless connection. Memory 17 may also represent multiple memory storage units which may be part of other computer systems. For example, memory 17 accessible via network 25 may be part of a computer server. Stored in memory 17 is a card conversion software application of one or more programs (referred to herein as card conversion software) which computer system 16 executes to enable the present invention.

A user interface 18 and a display 19 (such as a LCD or CRT monitor) is provided enabling a human operator (or user) to interact with computer system 16. User interface 18 for example may include touch screen, keypad, mouse, and/or trackpad, or other pointing device. Preferably, a graphical user interface is provided by the card conversion software using the display and such pointing device(s).

The computer system 16 can also receive scan data representative of media scanned upon a scanner 20, and can output print data on a printer 21 that prints on label stock 22. For example, scanner 20 may have a bulk feeder, and printer 21 may be a typical label printer (stationary or portable) with label stock 22 from a roll or sheets, or a desktop printer for printing on label stock. Computer system 16 has typical software and/or hardware to interface and operate scanner 20 so as to obtain scan data there from, and to interface and operate printer 21 for outputting print data. Software for reading, encoding, and decoding barcodes is also provided in computer system 16 as part of the card conversion software or as program modules usable by such software. Other software may also be present on the computer system 16 as typical of computer systems, such as an operating system or the like.

Figure 6:
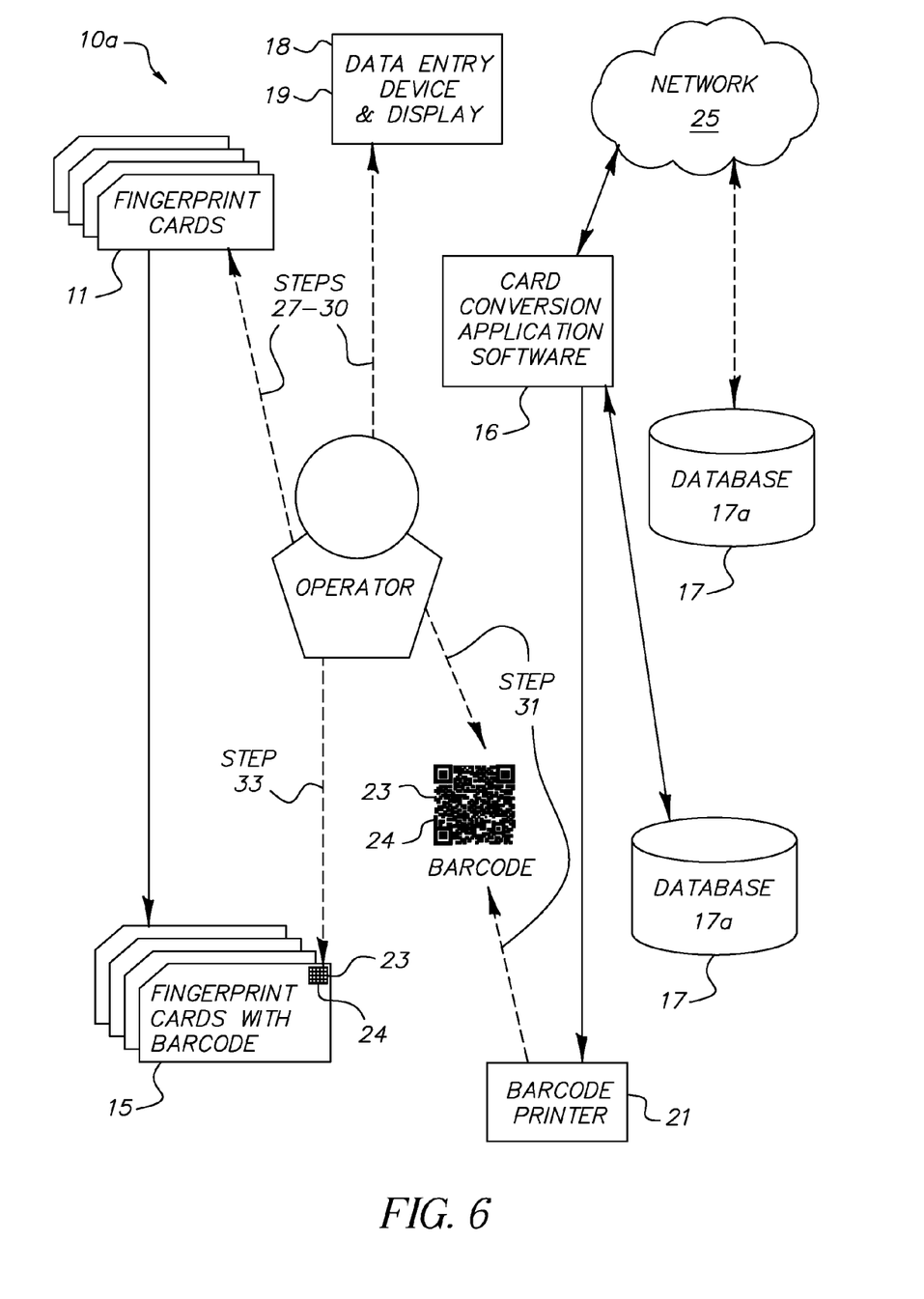
FIG. 6 graphically illustrates the part of system of FIG. 2 (or a separate system) in connection with FIG. 3, where the operator reads the fingerprint card, enters the biographic data, prints the barcode, and affixes the barcode to the fingerprint card.

As will be described below in more detail, the computer system 16 operates in accordance with the card conversion software with respect to each card 11 to encode biographical data or information 12 entered into the system 10 into a barcode 23 and to operate printer 21 to print the barcode on label stock 22, thereby providing a label 24 for application onto the card 11 (such as in space 11a) having such biographical data 12. Card 11 with a barcode 23 is represented by card 15 in FIGS. 6-8). The computer system 16 then scans the card 15, i.e., receives a scanned image from scanner 20 representative of card 15, to read the barcode 23 and to obtain digital images of fingerprints 13 recorded (e.g., inked) on that card 15, and stores biographical data 12 read from the barcode and images of the fingerprints 13 in an electronic fingerprint file (EFF) in memory 17 and/or in a database 17a. Other information may also be provided with such file, such as card type if desired. Further additional information regarding the operator and/or station used for processing may also be encoded into the barcode label. For example, date, time, location, software version, card format, customer, security, sensitivity, job number, batch number, unique index number for the card and information regarding associated records if multiple cards are found for one subject. However, other operator data, or a card tracking identifier, may be generated at computer system 16 or entered by the operator, as desired for encoding with biographical data 12. This may help to assist in quality control or training measures for on-going process improvement.

Figure 3:
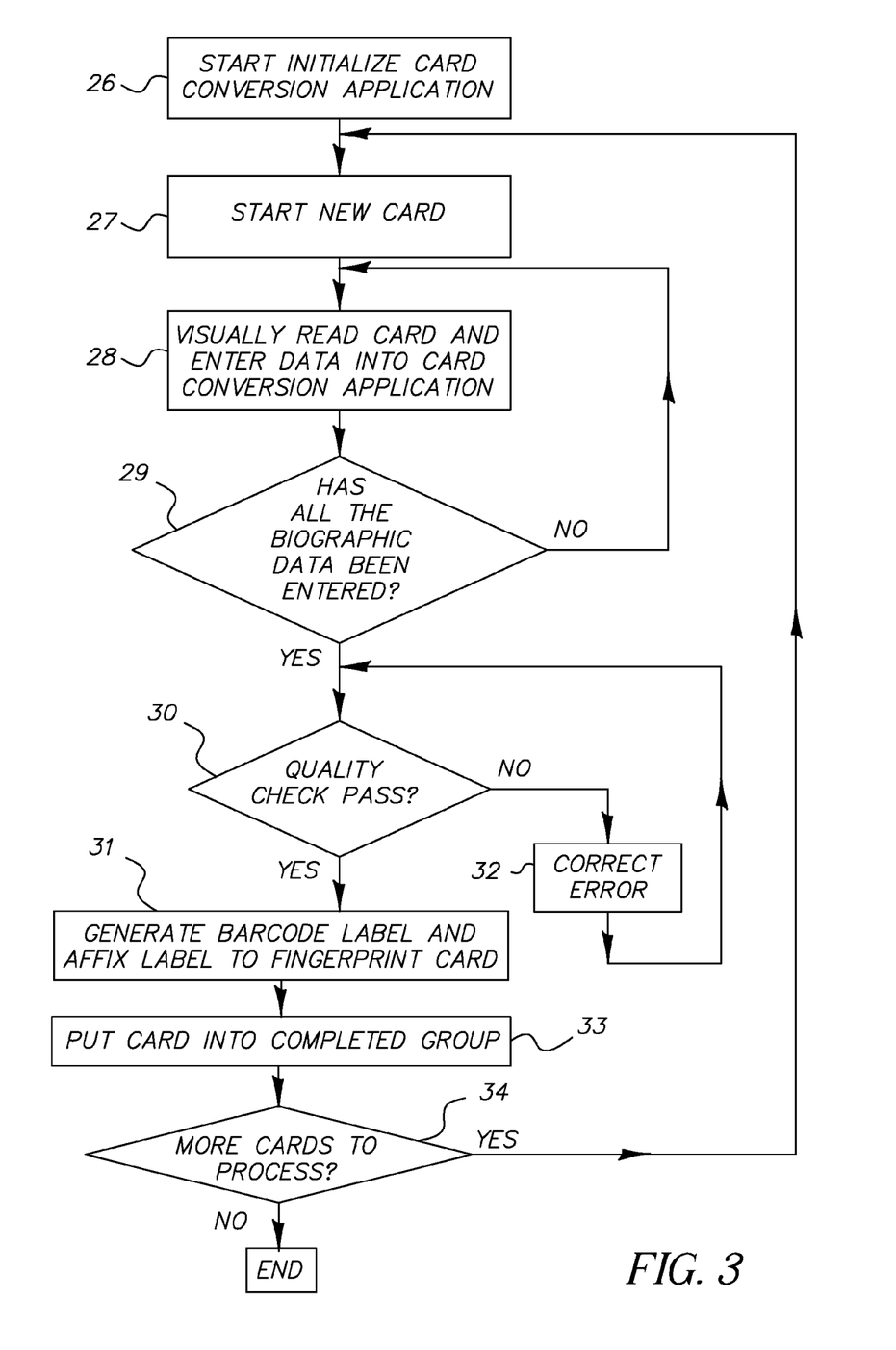
FIG. 3 is a flowchart showing the operation of the system of FIG. 2 for generating barcodes for application onto cards such as shown in FIG. 1.

Referring to FIG. 3, the operation of the card conversion software on computer system 16 is shown for encoding biographical data 12 entered into the system 10 into a barcode 23, which is printed on label stock 22 by printer 21 to provide a label 24 for application onto the card 11 (such as in space 11a) having such biographical data 12. The system 10 and its operation is graphically depicted in FIG. 6, where dashed arrows indicated the human operator interaction.

In FIG. 3, the operator starts the card conversion software and initializes the software (step 26). The initialization process may include a login and a security verification step. Additional configuration and/or physical location information may be read and loaded into the card conversion software. This data along with the operator information may ultimately be included in each barcode 23 when printed. Once the operator is authenticated and card conversion software is initialized, the operator will identify the scanned images to be converted from a local or network location, along with appropriate card format fingerprint card type(s) that will be used in the automated conversion process. The operator may select from a list of acceptable card formats within the card conversion software in accordance with the cards 11 to be processed. As different types of fingerprint record cards can differ in the type of biographical information listed, the operation selection of the card format tailors the input data fields to the particular card the operator will read from. Such list may be configurable in the card conversion software by using administrative privileges. Such data entry and card type selection may also be associated with a card verification file for a future quality assurance check. The verification file may also be modified by a pull down menu list so that the appropriate biographic context is used and verified for automated acceptance or notification for an end user. Also the card conversion software can monitor the biographic data as entered in real time and prevent the operator from entering invalid data and indicate required un-populated fields based on automated or manual administration of entry fields related to fingerprint card type.

Figure 4:
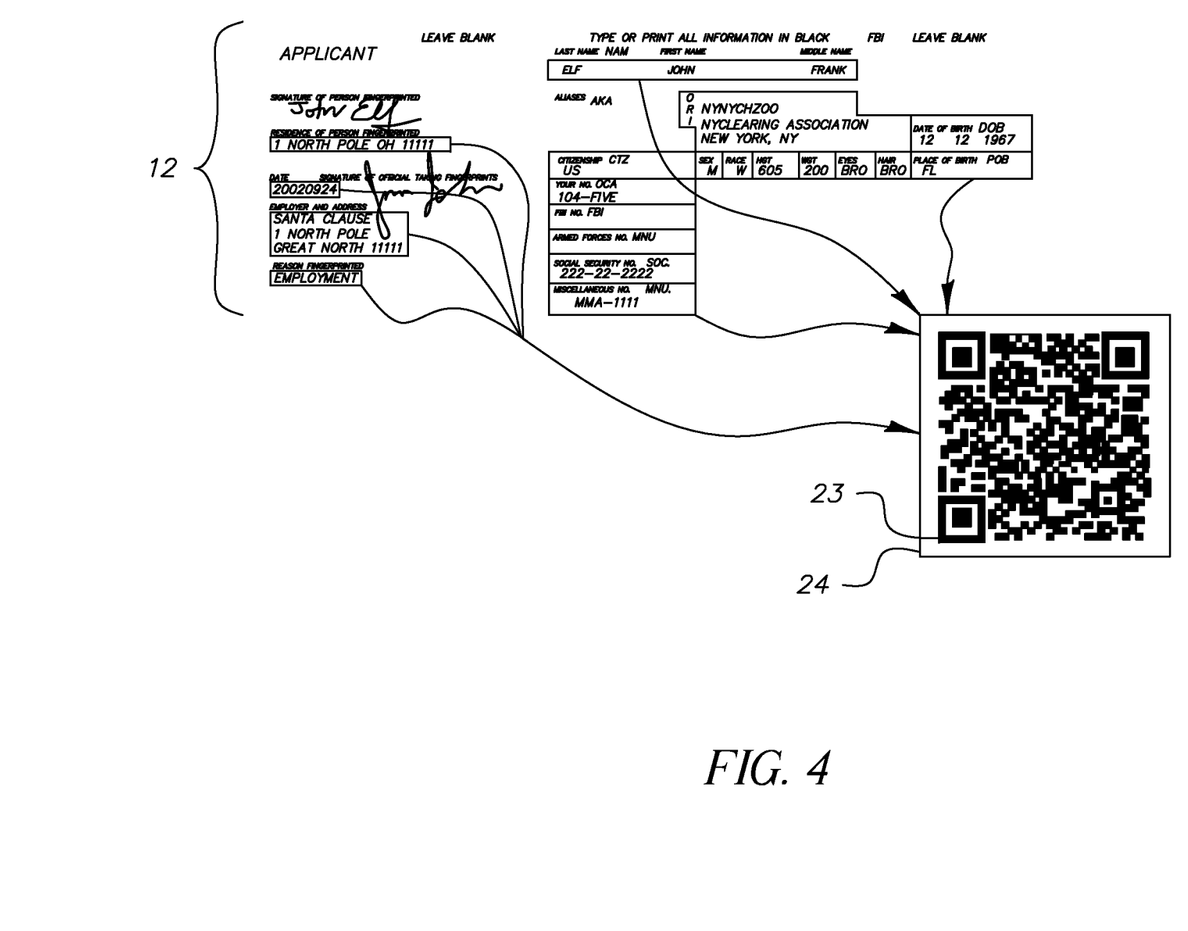
FIG. 4 is an example of one type of barcode which may be used to encode the biographical information on the card of FIG. 1.

For each card being processed (step 27), all the biographic data will be manually read by the operator using user interface 18 into computer system 16 and entered as instructed or prompted, such as via particular fields for such information prompted on one or more screens on display 19 (step 28). Optionally, all or part of biographic data may be entered using speech to text recognition when software is provided on computer system 16. The operator will continue until all the required biographic data are entered (step 29). It is possible that different data are required for different card types. After all the biographic data has been entered, the card conversion software encodes all the biographic data 12 along with any other variable data (determined by card conversion software configuration files in memory 17) into a printable machine readable barcode 23 pattern (as illustrated in FIG. 4). Variable data may be one or more items of additional information which may be included in the barcode as described earlier. At this point the card conversion software may or may not be required to mandate a quality check or "print preview" activity on a verification screen on display 19 (step 30). If correction is needed (step 32), the process then returns to the verification screen of step 30 and corrections are then made. The quality check may be a configurable option. Next the barcode 23 is printed onto label stock 22 to provide printed label 24, and the label 24 is then applied to the card 11 to provide one of cards 15 (step 31).

The printed barcode label 24 may be scanned using scanner 20 and decoded and checked against the verification file or configured verification parameters, if desired. A separated barcode reader, such as used in retail stores, may be provided for this function for computer system 16. Data encoded in the barcode 23 can automatically direct the card conversion software to use a particular verification file for the quality assurance step when later scanned and decoded. If there are errors identified within the barcode, the barcode itself will be destroyed and the errors will be diagnosed and corrected. In this manner, the operator can scan the barcode before affixing it to the fingerprint card for a quality verification.

Once the physical barcode is acceptable the barcode label 24 is affixed to the fingerprint card 11 in a specified location, such as shown in space 11a for the example of FIG. 1. The card conversion software may specifically show the operator (e.g., in a displayed graphic associated with the card type) where to place the barcode label 24 and prompt the operator to validate that the barcode label is affixed in the proper location. Different card types may require that the barcode label be placed in different locations. The location of the barcode label can also be configurable or identified in the fingerprint card form or template used for parsing information, as described later. Once the barcode label 24 is affixed to the fingerprint card 11 to provide card 15 (as depicted for example in FIGS. 6-8), the card 15 will be placed with all the other completed labeled fingerprint cards for later bulk processing of FIG. 5 (step 33). If there are more cards to be entered by the operator, steps 27-33 are repeated for each additional card until biographical data from all cards have been entered (step 34). If the card volume is low, each fingerprint card 15 after step 31 may be immediately scanned thereby completing the card conversion process and generating the electronic fingerprint file (EFF) for that card, as described below in connection with FIG. 5. When the barcode label 24 is generated there may be an entry into a database 17a in memory 17 indicating that the label was generated for further tracking through the various card conversion process. The connection to the database is optional depending on the particular need and configuration of the card conversion software.

As biographic data 12 may be difficult to scan and run optical character recognition so as to accurately determine the biographic data, in the preferred embodiment a human operator reads the fingerprint card biographic data 12 and inputs the data 12 into computer system 16 as described above. Less preferably, scanner 20 may be used with OCR at expected locations of the scanned image in accordance with the card type. OCR may be enabled by optical character recognition (OCR) software if provided on computer system 16. The verification screen then may be used providing verification of scanned information, and corrected if needed by the operator.

An example of biographic data from the fingerprint card being encoded into a barcode is illustrated in FIG. 4 for one type of card 11. Barcodes may be formatted such as in accordance with DataMatrix or PDF 417, but other barcode formats may be used. The card conversion software may be configured to use a specific one depending on data requirements. It is possible that administrative privileges are required to select or change the barcode formats.

Figure 5:
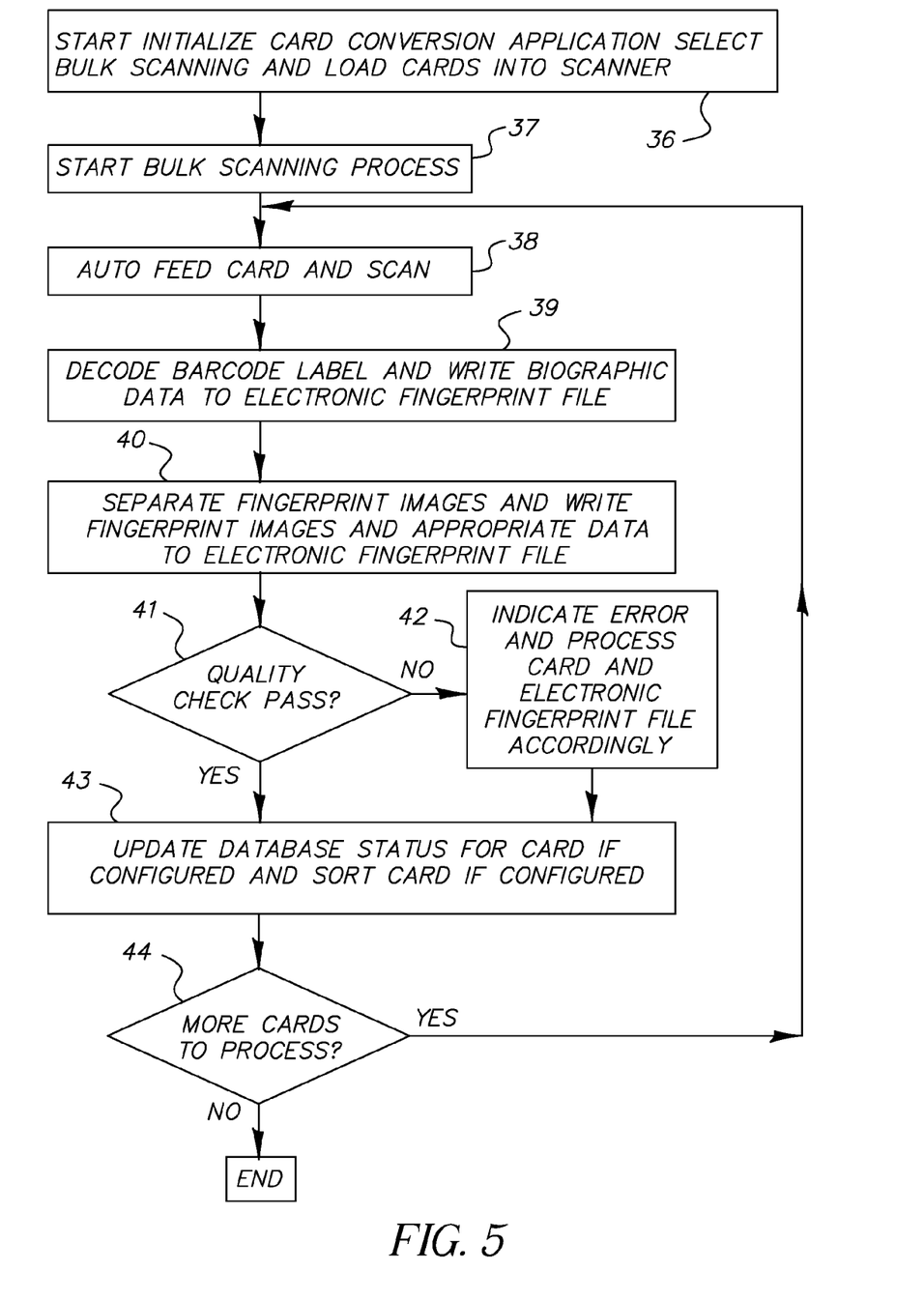
FIG. 5 is a flowchart showing the operation of the system of FIG. 2 for building a database of electronic fingerprint files from scanned images of cards with applied barcode labels.
Figure 7:
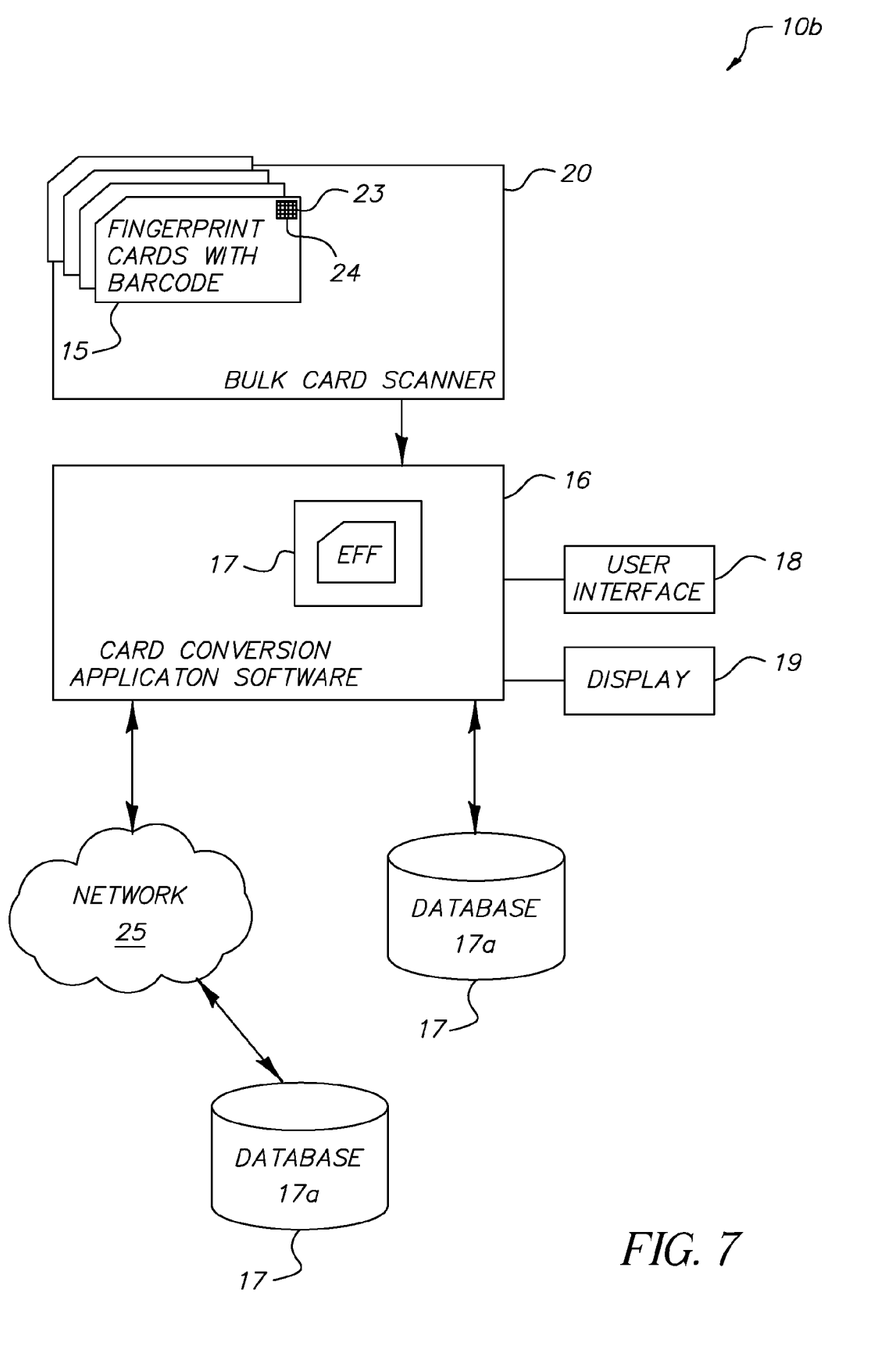
FIG. 7 graphically illustrates the part of system of FIG. 2 (or a separate system) in connection with FIG. 5, where the fingerprint cards with applied barcodes are scanned and electronic fingerprint files are generated.

Referring to FIG. 5, the operation of the card conversion software on computer system 16 is shown for bulk scanning multiple cards 15 so as to obtain a scanned image for each card 15 from which barcodes 23 are read and decoded and to obtain digital images of fingerprints 13 recorded on the card, and for each card then storing biographical data 12 read from the barcode and images of the fingerprints 13 in an electronic fingerprint file and/or in database 17a of memory 17. FIG. 7 graphically illustrates scanning cards 15 to generate electronic fingerprint files. The computer system 16 may the same or a different one of computer system 16 in connection with FIG. 3 and shown in FIG. 6. The cards 15 optionally may be manually fed into the scanner 20 one at a time. The card conversion software enables scanning either in manual or bulk scanning mode, as desired by the operator. In addition, the card conversion software may display the scanned image on display 19 for quality assurance or acceptance by the operator before scanning the next available card in a bulk processing activity. This may be selectable in the card conversion software. In the discussion of FIG. 5, bulk scanning of card 15 is described, rather than single feeding or manual placement of each card 15 on scanner 20. Once the card conversion software is initialized on computer system 16 and selected for bulk scanning, the stack of cards 15 is loaded into the scanner card feeder of scanner 20 (step 36). Once the cards 15 are loaded, the bulk scanning process is started through the card conversion software (step 37). Each card 15 in the feeder is auto fed into the scanner 20 one at a time (step 38). Once in the scanner 20, the fingerprint card 11 with the barcode 23 is scanned to generate a scanned image of the card.

The resulting scanned image is analyzed and the appropriate sections of the scanned image are processed. The barcode 23 is decoded and the biographic information obtained there from is written to the electronic fingerprint file (step 39), such as in accordance with EBTS or other file protocol for use by a typical fingerprint analysis system. Other information may be contained in the barcode 23 as stated earlier, and if present is also read by the computer system for storage in memory 17. This may optionally include the card type that was selected by the operator when entering the biographical data for the card, where such card type defines or is associated with a particular layout or format. Each fingerprint image 13b is segmented from the scanned image and written to the electronic fingerprint file using a predetermined scanning quality at step 40 (e.g., 500 ppi, 1,000 ppi). Other scanning resolutions are selectable based on requirements for the electronic fingerprint file. Additionally, image correction functionality may be provided for segmented fingerprint images 13b to adjust for scanned imperfections or alignment.

Such fingerprint images 13b can be easily identified by the card conversion software specifically to find fingerprint images on a fingerprint card, along with associating the appropriate fingerprint image to the location—finger type (e.g., right index finger). Each fingerprint has a specified location on the card and physical relationship to the other images on the card. Different card types can have the fingerprints in different locations. The card type indicates the location for the various fingerprints so that the computer system 16 reads the portions or spaces 13a within of the scanned image for that card type where each fingerprint image 13b is located (see FIG. 1).

Preferably, a parsing template is stored for each card type in memory 17. For example, for the type of card shown for example in FIG. 1, its parsing template specifies in terms of two-dimensional areas sized and/or oriented electronically over the scanned image where the pixels (or two-dimensional pixel areas) of each of fourteen spaces 13a/windows with fingerprints 13 should be expected in a scanned image of the card, as well as any other areas on the card where other data or information may be found, such as label 24, signatures, or the like. Such other areas may optionally be segmented into images and stored in the electronic fingerprint file. The computer system 16 selects the parsing template in accordance with the card type of card associated with the scanned image in memory of the computer system 16 and automatically segments each of the fingerprint images from the scanned image at locations per the selected template. The card type may be derived during the fingerprint card scanning process based on location of information, e.g., fingerprint images, graphics, lines, text, identifiers, location of affixed label 24, or other elements on cards differentiating them by card type; and/or, from the barcode when decoded as described earlier. In this case, the card type information is included in the barcode associating the card design with the physical scanned image. When the card is scanned the barcode information can be automatically (machine readable) decoded and this information can be used to help the card conversion software more accurately find the various fingerprint images in a timely manner. Further, if all the cards being processed using the scanner are all of the same type, the parsing template may be preselected by the operator of the computer system 16 for a set of cards to be automatically fed into the scanner.

Once the biographic data and fingerprint data (i.e., segmented fingerprint images of different types of fingers) have been written to the electronic fingerprint file (EFF), the file may then be checked for quality assurance and further image quality activities associated with biometric capture or preprocessing (step 41). This may be configurable or specified by the card conversion software. This step may or may not be processed or associated with the fingerprint card processing activity. Assuming the quality check is required the data in the electronic fingerprint file will be compared against all the possible acceptable combinations or pre-determined criteria. If there is an error then the fingerprint card is processed or adjusted accordingly (step 42). Optionally, sorting the cards with errors into a special location may be performed, while allowing error free cards to sort to a different location to enhance the processing throughput while enforcing integrity of automated data collection. The operator may be alerted on the display to remove the card and diagnose the error condition manually due to physical scanning errors or fingerprint card conditions. The error could be the result of invalid biographic data or a damaged or missing barcode label, or missing fingerprint images. The card may then need to be handled differently and will require someone to manually feed the card and diagnose the error at some point later. In the case of an error, the electronic fingerprint file may be segregated from the other electronic fingerprint files in memory 17 so that the invalid file does not contaminate the database 17a or other file repository of good electronic fingerprint files. A quality flag may be associated with each electronic fingerprint file and stored with the electronic fingerprint file (EFF) in the database 17a (step 43) indicating whether there was an error in processing the card. Database 17a may be in local memory of computer system 16 and/or in a memory remote to computer system 16 as available via network 25. The files can be sorted based on the quality flag for further diagnostics and processing. The scanned fingerprint card image need not be stored in the electronic fingerprint file or in database 17a, however such can occur if desired.

Once the electronic fingerprint file has been successfully written to the file system and/or database, the card conversion software will determine if all the cards have been processed (step 44). If there are still more cards to scan then the process will continue by loading the next card from the card feeder (step 38). It should also be noted that the card conversion software may have a buffer so that cards 15 can continue to be scanned and generate images into a buffer for future processing. The buffer may allow for optimal processing with regards to time but may also require changes to the quality check process and the handling of invalid cards. The connection to the database 17a is optional depending on the particular need and configuration of the card conversion software. For example, in addition to, or instead of, computer system 16 storing electronic file for cards 15 which may be suitable for fingerprint database searches, the biographical data and fingerprint images obtained from each scanned card may be stored by computer system 16 in a record in database 17a for use in biometric fingerprint matching, such as by typical software for enabling such function.

Figure 8:
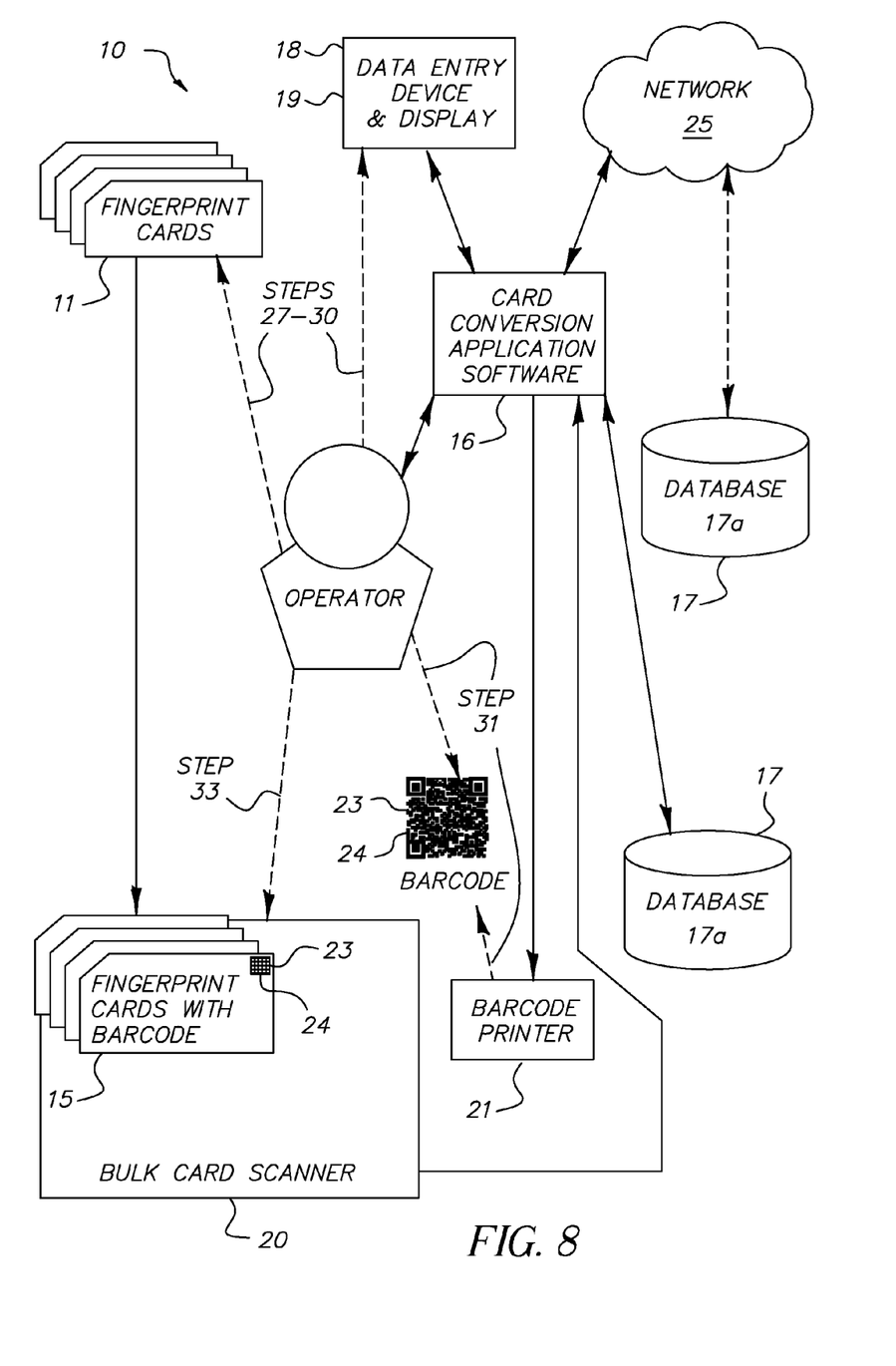
FIG. 8 graphically illustrates the system of FIG. 2, rather than as separate systems of FIGS. 6 and 7.

System 10 may be considered as being two separate systems 10a (FIGS. 6) and 10b (FIG. 7) each having a different one of computer system 16. Systems 10a and 10b may be at different locations from each other. System 10a represents a first part of system 10 providing a computer system 16 and components of FIG. 2 needed for operation thereof as (e.g., without scanner 20) described above in connection with FIG. 3 for encoding barcode labels on cards 11. System 10b represents a second part of system 10 providing a computer system 16 and components of FIG. 2 needed for operation thereof (e.g., with scanner 20 and optionally barcode printer 21) as described above in connection with FIG. 5 for scanning of cards 15 to generate electronic fingerprint files (EFF) representative of such cards and/or a record in a database 17a. System 10a and 10b may each have a complete instance of the card conversion software, or one or more programs thereof as needed for enabling their particular operation in memory accessible to such system. For example, the program(s) of the software for inputting at least biographical information from cards and encoding such in barcode labels for affixing to cards, may be different from program(s) of the software for scanning cards 15 and generating electronic fingerprint files representative of such cards 15 and/or a record in a database 17a. The system 10 as a whole system is graphically depicted in FIG. 8 representing a combination of FIGS. 6 and 7.

Optionally, if any signature is present on a fingerprint card when scanned, an image of the signature can be segmented from the scanned image of the card and stored in its electronic file and/or database 17a. The parsing template may be used by computer system 16 to locate area(s) of the scanned card image which may have such signature(s). The information stored in the electronic file may be automatically injected into other biometric software applications for template creation for biometric feature matching activities.

Although a two-dimensional barcode 23 is shown in FIGS. 4 and 6-8, the barcode 23 may be one-dimensional or other machine readable code capable of storing the desired biographic data, and any other data as described above. Further, human readable information may also be printed on the label if desired, so as to uniquely identify a part of the data encoded in the barcode, e.g., a unique index number, in case such is needed by an operator. Such human readable information may be used for indexing and/or quality control.

It should be understood that the word fingerprint or finger is meant to refer to not just a fingerprint or a finger but rather to any skin topology and any type or portion of skin (for example fingers, thumbs, palms, toes, etc.) which may be recorded on a card.

From the foregoing description, it will be apparent that there has been provided a system, method, and software, for conversion of fingerprint cards into digital format using machine reading codes. Variations and modifications in the herein described system, method, and software will undoubtedly suggest themselves to those skilled in the art. Accordingly, the foregoing description should be taken as illustrative and not in a limiting sense.

The invention claimed is:

1. A system for converting fingerprint cards into electronic files, in which each of said cards has at least biographical information and fingerprints of different types of fingers of a subject, said system comprising:

a computer system; and a printer in communication with said computer system, wherein said computer system operates in accordance with a program for inputting the biographical information from each of the cards and encoding said biographical information into a machine readable code which is printed by said printer on a label for affixing to the card.

2. The system according to claim 1 further comprising:

a scanner, in communication with said computer system or another computer system, for scanning each of the cards having the affixed label associated with the card to provide to said computer system or said another computer system a scanned image of the card; and said computer system, or said another computer system operating in accordance with said program or another program, for each of said cards scanned to decode the biographical information from said code from the scanned image of the card, segment a plurality of fingerprint images of the fingerprints of different types of fingers in the scanned image of the card, and store at least said decoded biographical information and said fingerprint images in one or more of an electronic file for the card or a record in a database in memory which is accessible to said computer system or said another computer system.

3. The system according to claim 2 wherein each of the cards is one of different card types which defines locations on the card of the fingerprints of different types of fingers on the card, and said computer system or said another computer system for each of said cards scanned determines from the scanned image the card type of the card, and said plurality of fingerprint images of the fingerprints are segmented from the scanned image at said locations of different types of fingers in the scanned image of the card in accordance with the determined card type of the card.

4. The system according to claim 2 wherein each of the cards are individually placed or bulk fed to the scanner.

5. The system according to claim 2 wherein one or more of the fingerprint images and biographical information stored for each of the cards is automatically checked by said computer system or said another computer system to determine any error in inputted biographical information or segmented images.

6. The system according to claim 1 wherein each of said cards is one of different card types which defines locations on the card of the fingerprints of different types of fingers on the card, said computer system for inputting the biographical information of each of the cards also inputs the card type for each of the cards into said memory, and encodes said card type with the biographical information into said machine readable code which is printed by said printer on said label for affixing to the card.

7. The system according to claim 6 further comprising:
a scanner, in communication with said computer system or another computer system, for scanning each of the cards having the affixed label associated with the card to provide to said computer system or said another computer system a scanned image of the card; and
said computer system, or said another computer system operating in accordance with said program or another program, for each of said cards scanned to decode the biographical information and card type from said code from the scanned image of the card, segment a plurality of fingerprint images of the fingerprints of different types of fingers in the scanned image of the card at said locations of different types of fingers in the scanned image of the card in accordance with the decoded card type, and store at least said decoded biographical information and said fingerprint images in one or more of an electronic file for the card or a record in a database in memory which is accessible to said computer system or said another computer system.

8. The system according to claim 1 wherein said computer system operating in accordance with said program for inputting the biographical information from each of the cards has a user interface and a display, and provides for each of said cards one or more screens on said display enabling a user via said user interface to input at least the biographical information from the card into said memory.

9. The system according to claim 1 wherein said computer system operating in accordance with a program for inputting the biographical information from each of the cards stores a verification file in said memory having said biographical information inputted by the user for each of the cards.

10. The system according to claim 1 further comprising a scanner or reader for reading the code after being printed on said label for at least one of said cards, and said computer system decodes said code to verify said biographical information encoded is accurate prior to placement of the label on the card.

11. The system according to claim 1 wherein other information is encoded with said biographical information from each of the cards.

12. The system according to claim 11 wherein said other information includes one or more of date, time, location, card type, job number, batch number, or unique index number for the card.

13. The system according to claim 1 further comprising memory of, or accessible by, said computer system, in which said memory has a database with an entry for each of the cards after the label was printed for tracking the card.

14. The system according to claim 1 wherein said computer system inputs said biographical information from each of the cards into said memory by OCR using a scanner.

15. The system according to claim 1 wherein said code is a barcode.

16. The system according to claim 1 wherein said printed label also has human readable information.

17. A method for converting information contained on fingerprint cards into electronic files, in which each of said cards has at least biographical data and fingerprints of different types of fingers of a subject, comprising the steps of:
encoding biographical data for a fingerprint card into a barcode;
printing the barcode on a label;
applying the label onto the card;
scanning the card to read the barcode and to obtain digital images of fingerprints on the card; and
storing biographical data read from the barcode and images of the fingerprints in an electronic file.

18. The method according to claim 17 further comprising the step of inputting said biographical data into memory of a computer system prior to carrying out said encoding step by said computer system, wherein said inputting step is carried out manually by a user of said computer system.

19. The method according to claim 17 comprising the step of repeating said encoding, said printing, said applying, said scanning, and said storing step for a plurality of ones of said card.

20. The method according to claim 19 wherein each of said plurality of ones of the cards is of one of different card types which defines locations on the card of the fingerprints on the card, and said scanning step for each of said plurality of ones of said card segments for the scanned card said digital images of each of the fingerprints on the card in accordance with the type of card.

21. A non-transitory computer-readable medium for converting paper fingerprint cards into electronic files, in which each of said cards has at least biographical data and fingerprints of different types of fingers of a subject, comprising:
software having one or more programs for encoding the biographical information into a barcode and operating a printer to print the barcode on a label for affixing to the card, receiving a scanned image of each of the cards having the affixed label associated with the card, and after each scanned image of a card is received, decoding the biographical information from barcode from the scanned image of the card, segmenting fingerprint images of the fingerprints of different types of fingers at locations in the scanned image, and generating an electronic fingerprint file having at least said decoded biographical information and the fingerprint images for the card.

22. A system for converting fingerprint cards into electronic files, in which each of said cards has at least biographical information encoded in a barcode and fingerprints of different types of fingers of a subject, said system comprising:
a computer system;
a scanner for scanning at least one of the fingerprint cards;
memory of, or accessible by, said computer system; and
said computer system, operating in accordance with one or more programs in said memory, receives said scanned image of said at least one of said fingerprint cards from said scanner, decodes at least biographical information from a barcode in the scanned image, segments a plurality of fingerprint images of the fingerprints of different types of fingers in the scanned image, and stores at least said decoded biographical information and said fingerprint images in one or more of an electronic file, or a record in a database, in said memory.

23. The system according to claim 22 wherein each of the fingerprint cards is one of different card types which defines locations on the card of the fingerprints of different types of fingers on the card, said computer system determines from the scanned image the card type of said at least one of the fingerprint cards using location of information in the scanned image or by said card type being decoded from the barcode which stores said card type along with biographical information, and said plurality of fingerprint images of the fingerprints are segmented from the scanned image at said locations of different types of fingers in the scanned image in accordance with the determined card type of the card.

* * * * *